(12) United States Patent
Obara et al.

(10) Patent No.: US 10,289,503 B2
(45) Date of Patent: May 14, 2019

(54) INFORMATION PROCESSING SYSTEM AND INFORMATION PROCESSING APPARATUS THAT BACK UP AND RESTORE DATA

(71) Applicant: KYOCERA DOCUMENT SOLUTIONS INC., Osaka (JP)

(72) Inventors: Shuhei Obara, Osaka (JP); Wataru Sunami, Osaka (JP); Yoshitaka Matsuki, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 223 days.

(21) Appl. No.: 15/384,744

(22) Filed: Dec. 20, 2016

(65) Prior Publication Data

US 2017/0185469 A1 Jun. 29, 2017

(30) Foreign Application Priority Data

Dec. 25, 2015 (JP) ................. 2015-253353
Dec. 25, 2015 (JP) ................. 2015-253354
Dec. 25, 2015 (JP) ................. 2015-253356

(51) Int. Cl.
*G06F 11/00* (2006.01)
*G06F 11/20* (2006.01)
(Continued)

(52) U.S. Cl.
CPC .......... *G06F 11/20* (2013.01); *G06F 11/1451* (2013.01); *G06F 11/1464* (2013.01);
(Continued)

(58) Field of Classification Search
CPC .. G06F 11/20; G06F 11/1451; G06F 11/1469; G06F 11/1464; H04N 1/00965; H04N 1/00917
(Continued)

(56) References Cited

U.S. PATENT DOCUMENTS 8,832,030 B1* 9/2014 Buchman ............ G06F 11/1451
707/650
8,850,140 B2* 9/2014 De Atley ............ G06F 11/1451
711/162
(Continued)

FOREIGN PATENT DOCUMENTS

JP 2006-279539 A 10/2006
JP 2007-089158 A 4/2007

OTHER PUBLICATIONS

Wikipedia "Dirty bit" page, retrieved using the Way Back Machine from https://web.archive.org/web/20151113154823/https://en.wikipedia.org/wiki/Degraded_mode (Year: 2015).*

(Continued)

*Primary Examiner* — Yair Leibovich
(74) *Attorney, Agent, or Firm* — Li & Cai Intellectual Property (USA) Office

(57) ABSTRACT

An image forming apparatus includes a data selector circuit that receives an instruction of a selection range from a serviceman via the operation unit and the display unit, and automatically selects data to be backed up in the external storage device in the selection range out of the pieces of data, a backup circuit that backs up the data selected by the data selector circuit out of the pieces of data in the external storage device being connected, and sends the data unselected by the data selector circuit to the database server for backup, and a restoring circuit that restores the data backed up in the external storage device in a first storage after replacement for the maintenance, then receives the data backed up in the database server, and restores the data in the first storage after replacement for the maintenance without the serviceman.

6 Claims, 13 Drawing Sheets

(51) Int. Cl.
*G06F 11/14* (2006.01)
*H04N 1/00* (2006.01)

(52) U.S. Cl.
CPC ..... *G06F 11/1469* (2013.01); *H04N 1/00917* (2013.01); *H04N 1/00965* (2013.01)

(58) Field of Classification Search
USPC ...................................................... 714/6.11
See application file for complete search history.

(56) References Cited

U.S. PATENT DOCUMENTS

2005/0289272 A1* 12/2005 Masuoka ................ H04L 41/06
710/260
2007/0076256 A1 4/2007 Yamamoto et al.
2013/0173554 A1* 7/2013 Ubukata ............. G06F 11/1448
707/640
2016/0328293 A1* 11/2016 Gough .................... G06F 11/14

OTHER PUBLICATIONS

Wikipedia "RAID" page, retrieved using the Way Back Machine from https://web.archive.org/web/20151128093425/https://en.wikipedia.org/wiki/RAID (Year: 2015).*
Wikipedia "Degraded mode" page, retrieved using the Way Back Machine from https://web.archive.org/web/20151113154823/https://en.wikipedia.org/wiki/Degraded_mode (Year: 2015).*

* cited by examiner

INFORMATION PROCESSING SYSTEM AND INFORMATION PROCESSING APPARATUS THAT BACK UP AND RESTORE DATA

CROSS REFERENCE TO RELATED APPLICATION

This application claims the benefit of Japanese Priority Patent Applications JP2015-253353, JP2015-253354, and JP2015-253356 filed Dec. 25, 2015, the entire contents of which are incorporated herein by reference.

BACKGROUND OF THE INVENTION

1. Field of the Invention

The present disclosure relates to an information processing system and an information processing apparatus that back up and restore data.

2. Description of Related Art

Typically, in many cases, an image forming apparatus (MFP, Multifunction Peripheral) has only one internal storage device such as an HDD (Hard disk drive) or an SSD (Solid state drive) to cut costs.

Further, when it is expected that a failure has occurred in the internal storage device of the image forming apparatus, the internal storage device is replaced by a new internal storage device. At this time, typically, a serviceman backs up data stored in the internal storage device to be replaced in an external storage device, replaces the internal storage device, and then restores the backed-up data.

SUMMARY OF THE INVENTION

According to an embodiment of the present disclosure, there is provided an information processing system, including: an external storage device; an image forming apparatus; and a database server connected to the image forming apparatus via a network, in which the image forming apparatus includes a first communication unit capable of communicating with the database server, an operation unit, a display unit, an external storage controller, the external storage device being capable of connecting to the external storage controller, a first storage storing pieces of data to be backed up for replacement for maintenance, a data selector circuit that receives an instruction of a selection range from a serviceman via the operation unit and the display unit, and automatically selects data to be backed up in the external storage device in the selection range out of the pieces of data, a backup circuit that backs up the data selected by the data selector circuit out of the pieces of data in the external storage device being connected, and sends the data unselected by the data selector circuit to the database server for backup, and a restoring circuit that restores the data backed up in the external storage device in a first storage after replacement for the maintenance, then receives the data backed up in the database server, and restores the data in the first storage after replacement for the maintenance without the serviceman, and the database server includes a second communication unit capable of communicating with the image forming apparatus, a second storage that stores a database capable of recording the data sent from the image forming apparatus, and a database manager circuit that records the data sent from the image forming apparatus in the database, and sends the data recorded in the database to the image forming apparatus to restore the data.

According to an embodiment of the present disclosure, there is provided an information processing system, including: an external storage device; an image forming apparatus; and a database server connected to the image forming apparatus via a network, in which the image forming apparatus includes a first communication unit capable of communicating with the database server, an operation unit, a display unit, an external storage controller, the external storage device being capable of connecting to the external storage controller, a first storage storing pieces of data to be backed up for replacement for maintenance, a data selector circuit that receives an instruction of selection from a serviceman via the operation unit and the display unit, and selects data to be backed up in the external storage device based on the instruction of selection out of the pieces of data, a backup circuit that backs up the data selected by the data selector circuit out of the pieces of data in the external storage device being connected, and sends the data unselected by the data selector circuit to the database server for backup, and a restoring circuit that restores the data backed up in the external storage device in a first storage after replacement for the maintenance, then receives the data backed up in the database server, and restores the data in the first storage after replacement for the maintenance without the serviceman, and the database server includes a second communication unit capable of communicating with the image forming apparatus, a second storage that stores a database capable of recording the data sent from the image forming apparatus, and a database manager circuit that records the data sent from the image forming apparatus in the database, and sends the data recorded in the database to the image forming apparatus to restore the data.

According to an embodiment of the present disclosure, there is provided an information processing apparatus, including: an external storage controller capable of connecting to an external storage device; a storage storing pieces of data to be backed up for replacement for maintenance, each of the pieces of data having a status attribute indicating a status of the data; a job interruption circuit that interrupts a job being executed when it is expected that a failure has occurred in the storage, and records that the job is interrupted and the interrupted job in the status attribute of data in relation to the job being executed; a backup circuit that backs up the pieces of data in the external storage device being connected; a restoring circuit that restores the pieces of data backed up in the external storage device in a storage after replacement for the maintenance; and a job restart circuit that retrieves the status attributes of the pieces of data after restoring the pieces of data by the restoring circuit, and restarts the interrupted job based on the status attribute of the data recording that the job is interrupted.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 6 shows the flow of automatically selecting data by the data selector unit 21a;

FIG. 13 shows the flow of automatically selecting data by the data selector unit 21a.

DETAILED DESCRIPTION OF THE PREFERRED EMBODIMENTS

Hereinafter, embodiments of the present disclosure will be described with reference to the drawings.

1. First Embodiment

[Entire Configuration]

Figure 1:
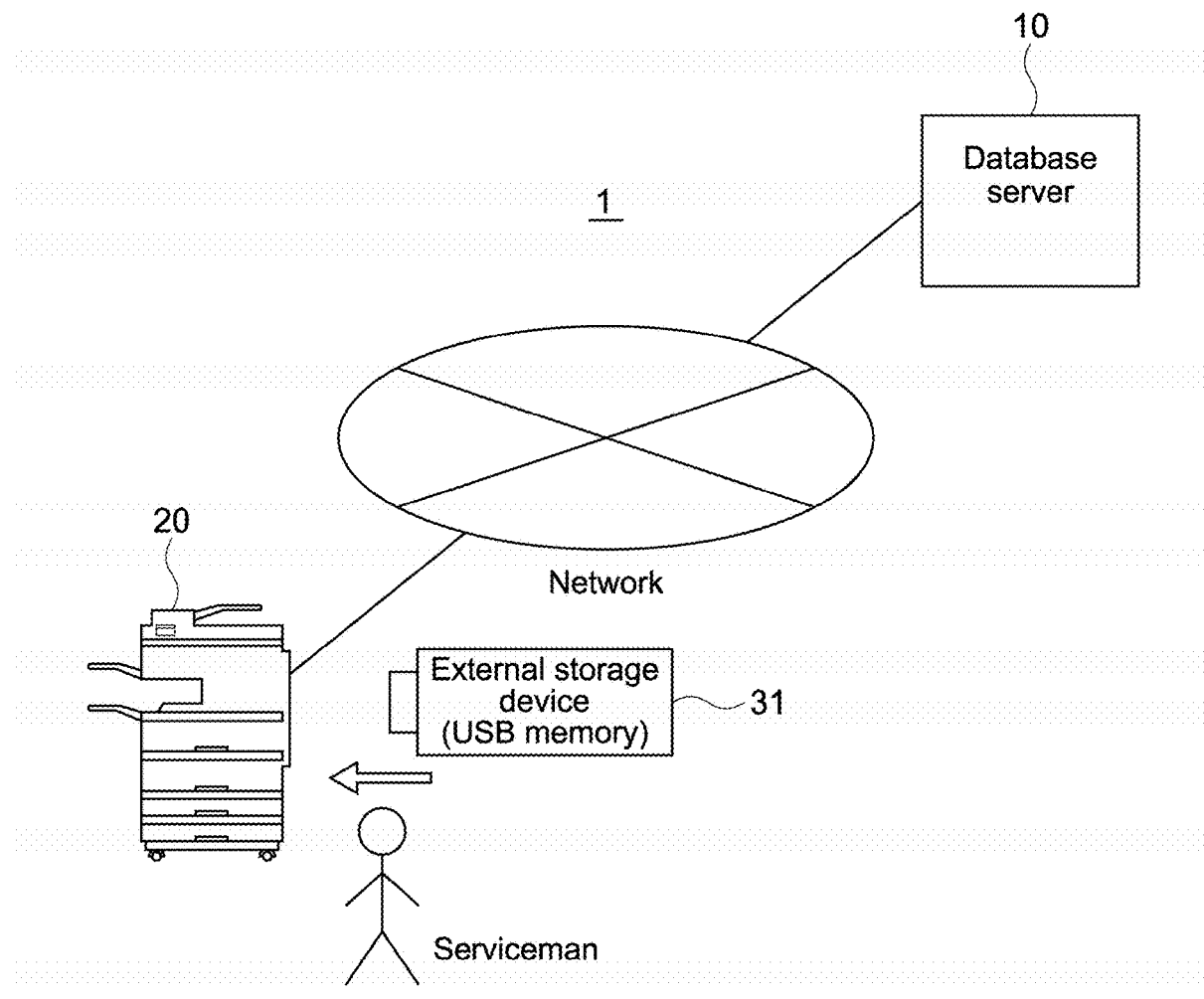
FIG. 1 shows the information processing system 1 of the first embodiment of the present disclosure.

First, the entire configuration of an information processing system according to a first embodiment of the present disclosure will be described. FIG. 1 shows the information processing system 1 of the first embodiment of the present disclosure.

The information processing system 1 includes the external storage device 31, the database server 10, and the image forming apparatus 20. The database server 10 is connected to the image forming apparatus 20 via a network. Note that, in the following description, the external storage device 31 is a USB (Universal Serial Bus) memory, for example.

When the possibility of occurrence of a failure of the internal storage device, which is the storage of the image forming apparatus 20, is increased, an alert is issued. Then a serviceman comes to the site of the image forming apparatus 20 to replace the internal storage device of the image forming apparatus 20.

When replacing the internal storage device, the serviceman backs up data, which is now stored in the internal storage device of the image forming apparatus 20, in an external storage device, then replaces the internal storage device, and restores the backed-up data after replacement.

According to this embodiment, it is desirable to reduce time that a serviceman spends out of the total maintenance operation time by dividing data-to-be-backed-up into data necessary immediately after the maintenance operation and data necessary not immediately after the maintenance operation and by backing up and restoring those types of data in different ways.

When backing up data, data-necessary-immediately-after-maintenance is selected automatically. Since data-necessary-immediately-after-maintenance is selected automatically, it may reduce the possibility of not selecting necessary data than selecting necessary data pieces one by one by a serviceman.

Selected data is backed up in the USB memory 31 connected to the image forming apparatus 20, and unselected data is backed up in the database server 10 of the network.

When restoring data, the image forming apparatus 20 is ready immediately after restoring the data only from the USB memory 31 by the serviceman. So the serviceman may leave from the site after confirming the ready status.

The data backed up in the database server 10 is restored from the database server 10 without the serviceman background or when the image forming apparatus 20 is executing no job.

[Configuration of Database Server]

Figure 2:
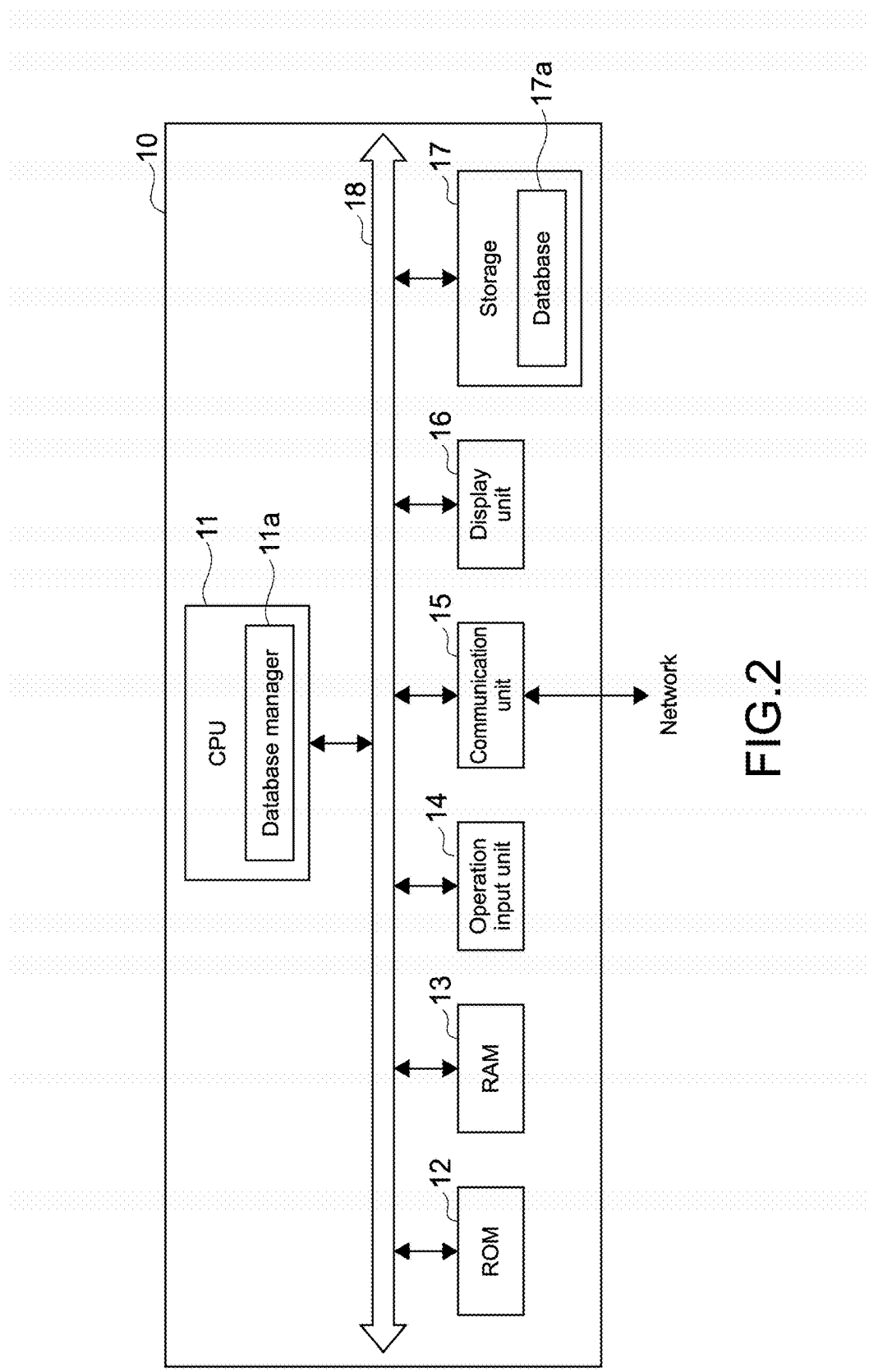
FIG. 2 shows the configuration of the database server 10.

Next, the configuration of the database server 10 will be described. FIG. 2 shows the configuration of the database server 10.

As shown in FIG. 2, the database server 10 includes the CPU (Central Processing Unit) 11, the ROM (Read Only Memory) 12, the RAM (Random Access Memory) 13, the operation input unit 14, the communication unit 15 (second communication unit), the display unit 16, and the storage 17 (second storage). Those blocks are connected to each other via the bus 18.

The ROM 12 stores data and programs such as firmware used to execute various kinds of processing. The RAM 13 is a work area for the CPU 11, and temporarily stores the OS (Operating System), various kinds of application being executed, and various kinds of data being processed.

The storage 17 includes, for example, an HDD (Hard Disk Drive), a flash memory, and other nonvolatile memories. The storage 17 stores the database 17a that records the OS, various kinds of application, various kinds of data, and backed up data of the image forming apparatus 20.

The communication unit 15 is connected to the network for sending/receiving information to/from the image forming apparatus 20.

The CPU 11 expands a program corresponding to a request from the operation input unit 14 into the RAM 13 out of the programs recorded in the ROM 12 and the storage 17, and controls the display unit 16 and the storage 17 according to the expanded program appropriately.

The operation input unit 14 is, for example, a pointing device such as a mouse, a keyboard, a touch panel, or another operation device.

The display unit 16 is, for example, a liquid crystal display, an EL (Electro-Luminescence) display, a plasma display, or the like.

Next, the functional block realized by executing a program by the CPU 11 will be described.

The functional block realized by the CPU 11 of the database server 10 is the database manager 11a.

The database manager 11a records data sent from the image forming apparatus 20 in the database 17a when backing up the data, and sends data recorded in the database 17a to the image forming apparatus 20 when restoring the data in the image forming apparatus 20.

[Configuration of Image Forming Apparatus]

Figure 3:
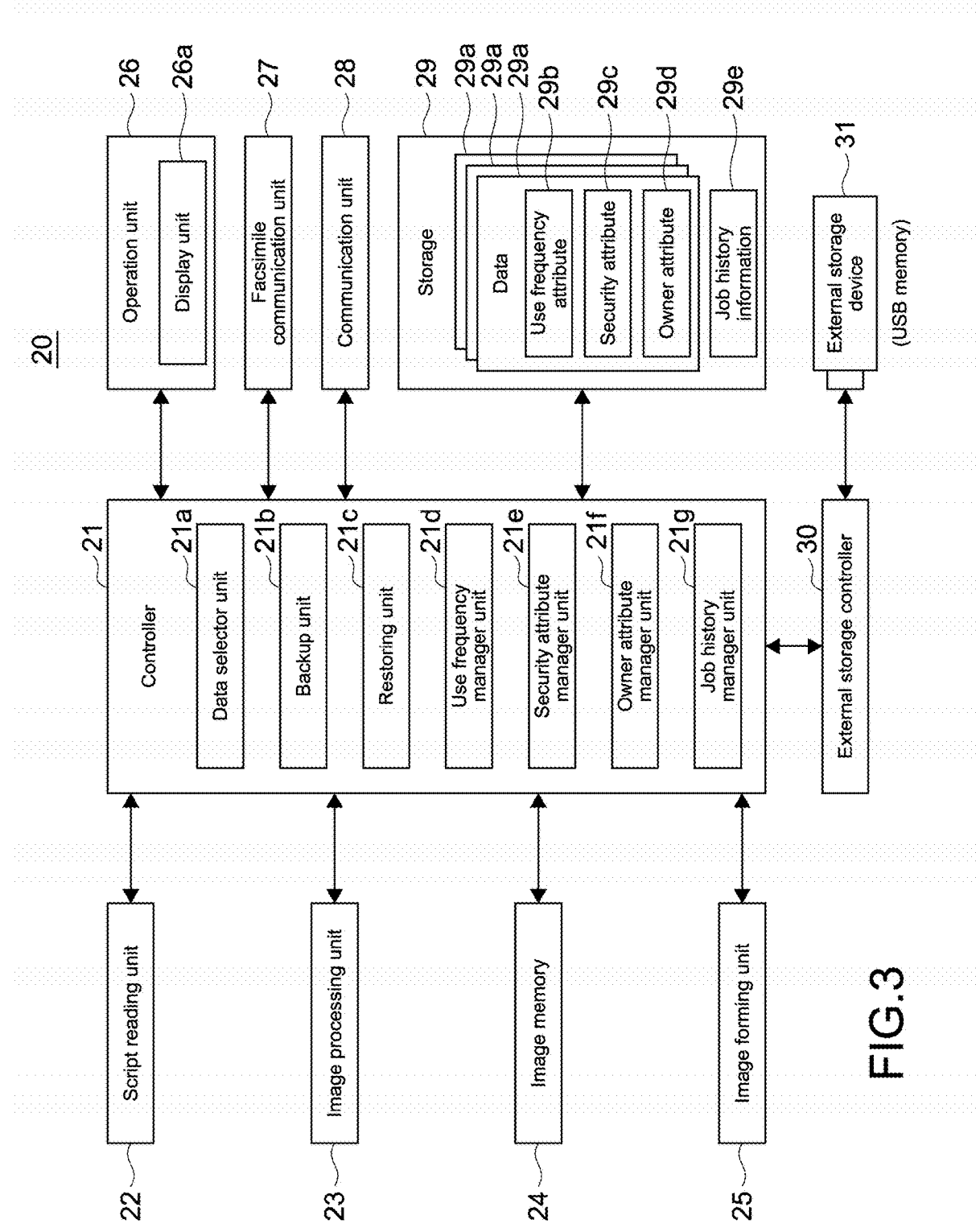
FIG. 3 shows the configuration of the image forming apparatus 20.

Next, the configuration of the image forming apparatus 20 will be described. FIG. 3 shows the configuration of the image forming apparatus 20.

The image forming apparatus 20 includes the controller 21. The controller 21 includes a CPU, a RAM, a ROM, a dedicated hardware circuit, and the like, and controls the entire operation of the image forming apparatus 20.

The controller 21 is connected to the script reading unit 22, the image processing unit 23, the image memory 24, the image forming unit 25, the operation unit 26, the display unit 26a, the facsimile communication unit 27, the communication unit 28 (first communication unit), the storage 29 (second storage), the external storage controller 30, and the like. The controller 21 controls operations of the respective units connected thereto and exchanges signals and data with those units.

The controller 21 controls, according to job execution instructions input by a user via the operation unit 26, a PC connected to the network, and the like, drive and processing of a mechanism requisite for executing operational control of the functions including a scanner function, a printing function, a copy function, and a facsimile exchange function.

Further, the controller 21 includes the data selector unit 21a, the backup unit 21b, the restoring unit 21c, the use frequency manager unit 21d, the security attribute manager unit 21e, the owner attribute manager unit 21f, and the job history manager unit 21g.

The data selector unit 21a, the backup unit 21b, the restoring unit 21c, the use frequency manager unit 21d, the security attribute manager unit 21e, the owner attribute manager unit 21f, and the job history manager unit 21g are functional blocks realized by loading programs stored in the ROM or the like into the RAM and executing the programs by the CPU.

The data selector unit 21a automatically selects data, the kind of data being instructed by a serviceman by using a data selecting window (described later).

The backup unit 21b backs up the data selected by the data selector unit 21a in the USB memory 31, and backs up the unselected data in the database server 10.

The restoring unit 21c restores data from the USB memory 31, and restores data from the database server 10.

The use frequency manager unit 21d manages the use frequency of data used by the image forming apparatus 20 based on a use frequency attribute, which is an attribute of each data. When the data selector unit 21a selects data having a higher use frequency, such data is selected via the use frequency manager unit 21d.

The security attribute manager unit 21e manages necessity/unnecessity of a high security level of data used by the image forming apparatus 20 based on a security attribute, which is an attribute of each data. When the data selector unit 21a selects data not to be backed up in the database server 10 of the network since the data requires a high security level, such data is selected via the security attribute manager unit 21e.

The owner attribute manager unit 21f manages an owner of data used by the image forming apparatus 20 based on an owner attribute, which is an attribute of each data. When the data selector unit 21a selects data in relation to a particular user, such data is selected via the owner attribute manager unit 21f.

The job history manager unit 21g manages a job executed by the image forming apparatus 20 by recording the history of data used for the job as job history information. When the data selector unit 21a selects data of a recently-executed job, such data is selected via the job history manager unit 21g.

The script reading unit 22 obtains an image from a script.

The image processing unit 23 processes image data of an image read by the script reading unit 22 appropriately. For example, the image processing unit 23 carries out image processing such as shading correction for improving image quality of an image formed based on the image read by the script reading unit 22.

The image memory 24 includes an area for temporarily storing data of a script image read by the script reading unit 22 and temporarily storing data to be printed by the image forming unit 25.

The image forming unit 25 forms an image based on the image data read by the script reading unit 22 or the like.

The operation unit 26 includes a touch panel unit and an operation key unit that accept user instructions on various operations and processing executable by the image forming apparatus 20. The touch panel unit includes a display unit 26a such as an LCD (Liquid Crystal Display) that is provided with a touch panel.

The facsimile communication unit 27 includes an encoder/decoder, a modulator/demodulator, and an NCU (Network Control Unit) (not shown), and sends facsimile via a public telephone line network.

The communication unit 28 includes communication modules such as a LAN board, and sends/receives various kinds of data to/from the database server 10 and devices (PC, etc.) in the local area via the LAN connected to the communication unit 28 and the like.

The storage 29 stores the pieces of data 29a and the job history information 29e. Examples of the data 29a include script images obtained by the script reading unit 22, an address book, and the like. The data 29a contains not only the data itself but also the use frequency attribute 29b, the security attribute 29c, and the owner attribute 29d as attribute information. The storage 29 is a large-volume storage device such as an HDD.

The external storage controller 30 controls input/output of data into/from the external storage device 31 such as the USB memory 31 connected to the external storage controller 30. The external storage controller 30 may include an input/output I/F (Interface).

[Data Selecting Window]

Figure 4:
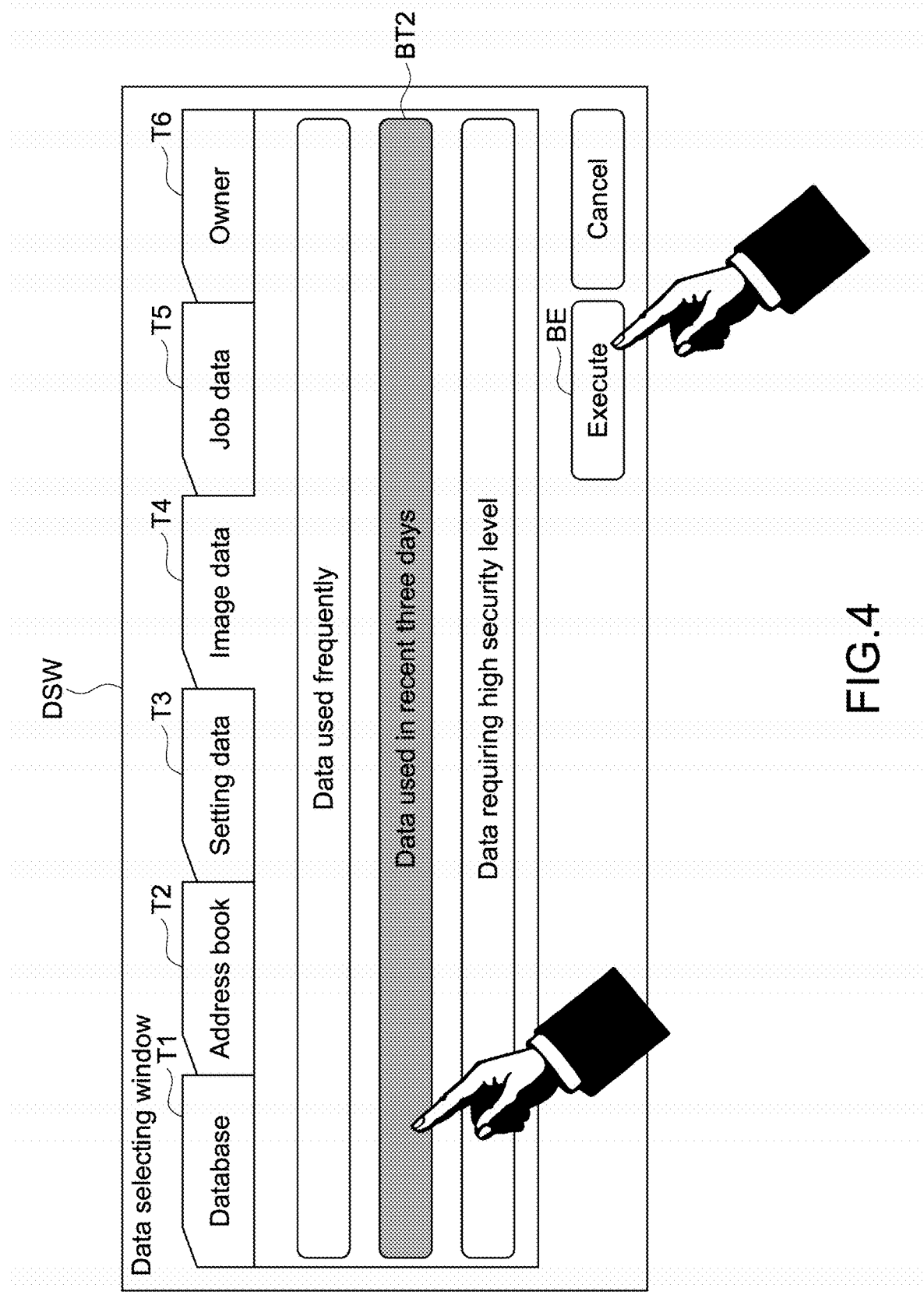
FIG. 4 shows an example of the data selecting window DSW.

Next, an example of the above-mentioned data selecting window will be described. FIG. 4 shows an example of the data selecting window DSW. Note that a serviceman only specifies the kind of data to be backed up in the USB memory 31 via this window, and the data selector unit 21a automatically selects pieces of data one by one.

As shown in FIG. 4, the data selecting window DSW includes the tab T1 for selecting a database of the storage 29, the tab T2 for selecting an address book, the tab T3 for selecting setting data, the tab T4 for selecting image data, the tab T5 for selecting data of a recently-executed job, and the tab T6 for selecting data of a particular user specified.

As shown in FIG. 4, the tab T4 is selected. A serviceman selects the icon BT2 for specifying data used in the recent three days, and then presses the execute button BE, whereby a data selection range is instructed.

An example of the data selecting window has been described above.

[Processing Flow (Overall)]

Figure 5:
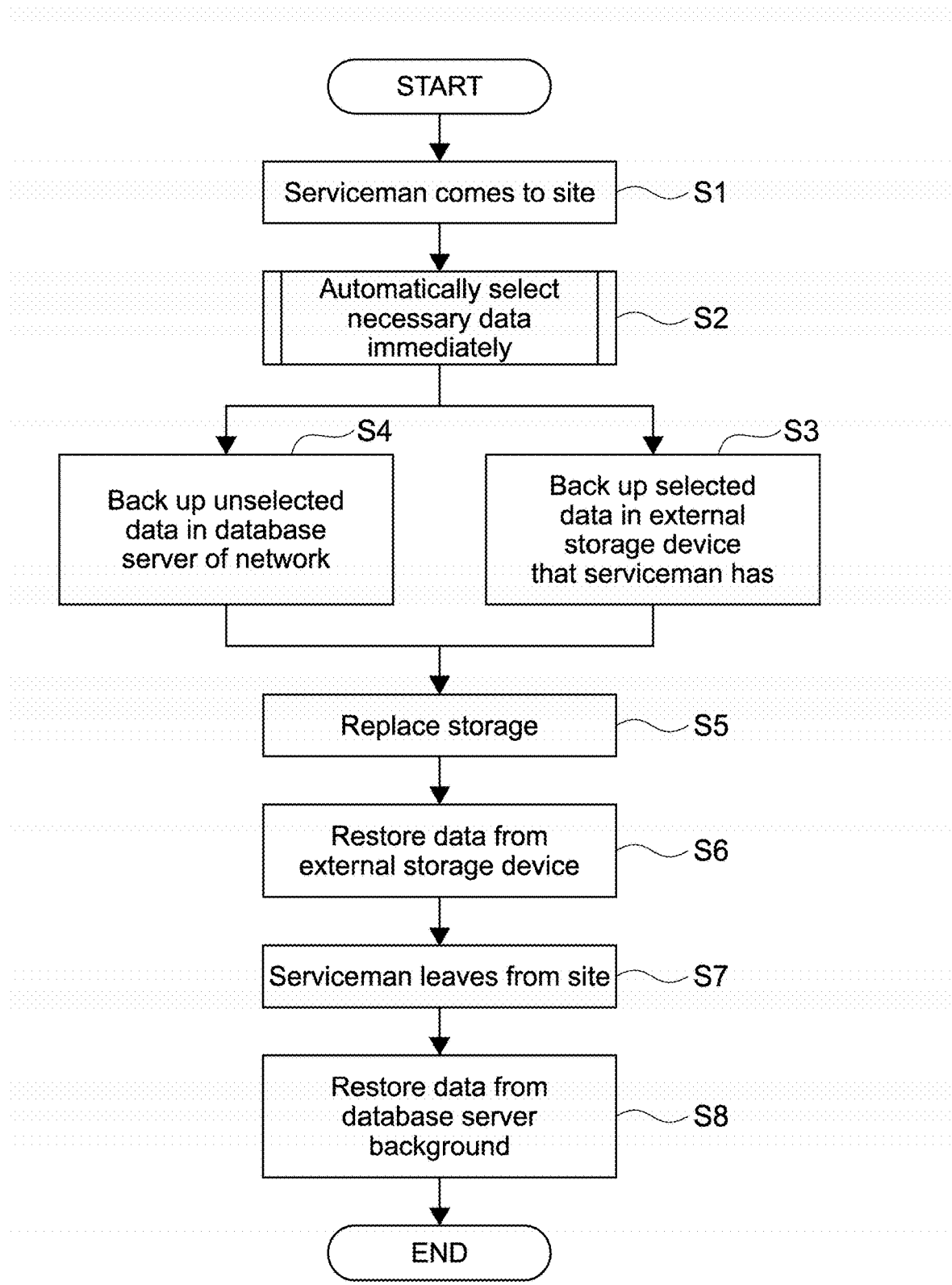
FIG. 5 shows the overall processing flow of the information processing system 1.

Next, the overall processing flow of the information processing system 1 will be described. FIG. 5 shows the processing flow of the information processing system 1.

First, a serviceman comes to a site of the image forming apparatus 20 in order to replace the storage 29 of the image forming apparatus 20 (Step S1).

Next, the data selector unit 21a automatically selects data to be backed up in the USB memory 31 via the operation unit 26 and the data selecting window (Step S2). Note that the selection processing will be described later in detail.

Next, the backup unit 21b backs up the selected data in the USB memory 31 that the serviceman has (Step S3), and backs up the unselected data in the database server 10 of the network (Step S4).

Next, the serviceman replaces the storage 29 (Step S5).

Next, the restoring unit 21c restores the data backed up in the USB memory 31 (Step S6).

Next, the serviceman confirms operations of the image forming apparatus 20 based on the data restored from the USB memory 31, and then leaves from the site (Step S7).

Next, the restoring unit 21c restores the data backed up in the database server 10 without the serviceman (Step S8).

[Processing Flow (Automatic Selection)]

Figure 6:
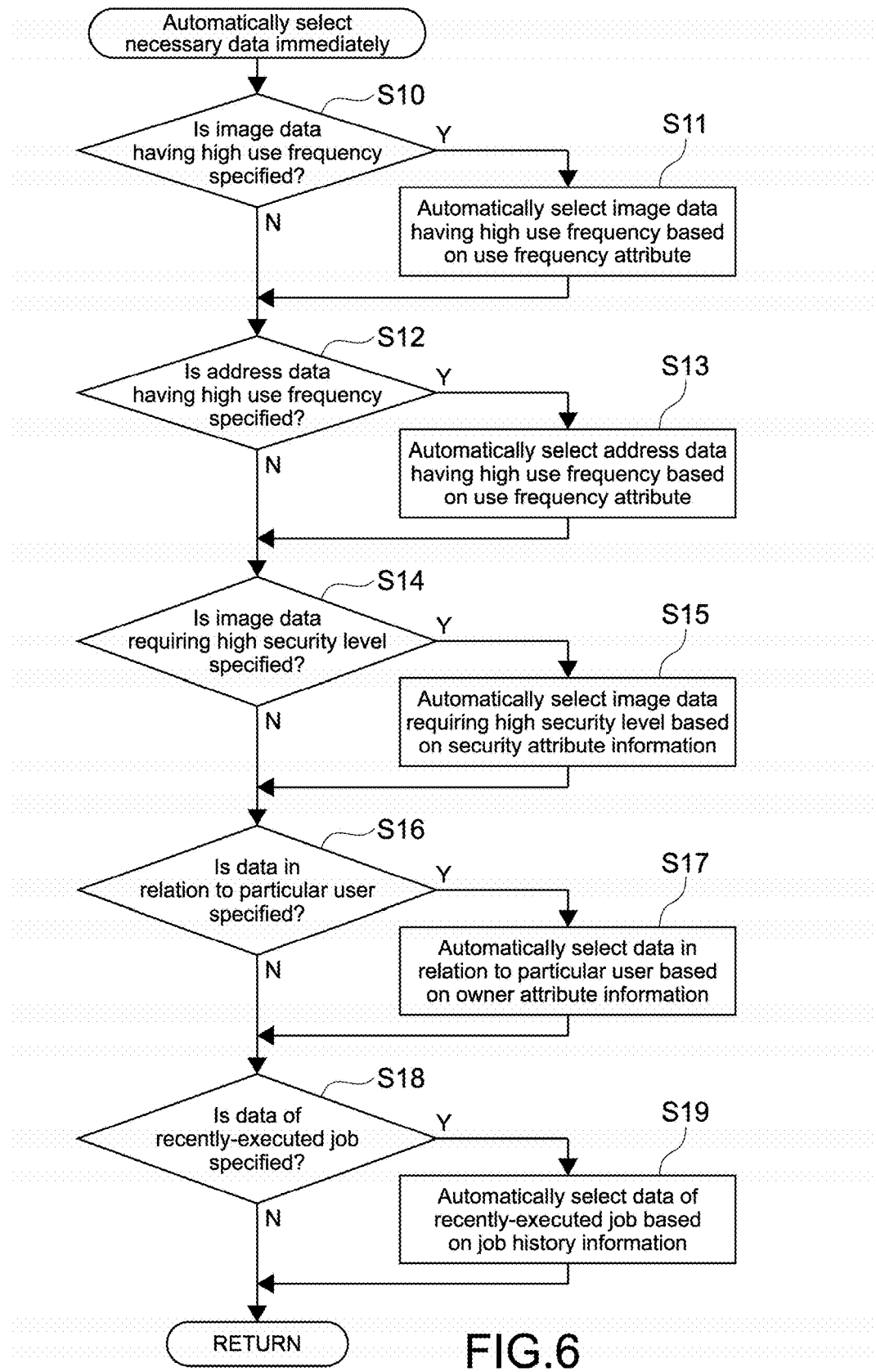

Next, the processing of automatically selecting data by the data selector unit 21a will be described. FIG. 6 shows the flow of automatically selecting data by the data selector unit 21a.

First, the data selector unit 21a determines if image data having a use frequency higher than a first threshold is specified or not as the selection range of data to be backed up in the USB memory 31 (Step S10).

When image data having a use frequency higher than the first threshold is specified (Step S10, Y), the data selector unit 21a selects image data having a use frequency higher than the first threshold via the use frequency manager unit 21d (Step S11).

Next, the data selector unit 21a determines if address data having a use frequency higher than the first threshold is specified or not as the selection range of data to be backed up in the USB memory 31 (Step S12).

When address data having a use frequency higher than the first threshold is specified (Step S12, Y), the data selector unit 21a selects address data having a use frequency higher than the first threshold via the use frequency manager unit 21d (Step S13).

Next, the data selector unit 21a determines if image data requiring a high security level is specified or not as the selection range of data to be backed up in the USB memory 31 (Step S14).

When image data requiring a high security level is specified (Step S14, Y), the data selector unit 21a selects image data requiring a high security level via the security attribute manager unit 21e (Step S15).

Next, the data selector unit 21a determines if data in relation to a particular user is specified or not as the selection range of data to be backed up in the USB memory 31 (Step S16).

When data in relation to a particular user is specified (Step S16, Y), the data selector unit 21a selects data in relation to a particular user via the owner attribute manager unit 21f (Step S17).

Next, the data selector unit 21a determines if data of the specific number of recent jobs executed by the device is specified or not as the selection range of data to be backed up in the USB memory 31 (Step S18). Note that, for example, the recent means ten jobs executed lately.

When data of the specific number of recent jobs executed by the device is specified (Step S18, Y), the data selector unit 21a selects data of the specific number of recent jobs executed by the device via the job history manager unit 21g (Step S19).

Note that, in addition to automatically selecting data according to the above-mentioned method, a serviceman may specify pieces of data one by one and the selected data may be backed up additionally.

[Notes]

As described above, according to this embodiment, the information processing system 1 includes: the external storage device 31; the image forming apparatus 20; and the database server 10 connected to the image forming apparatus via a network, in which the image forming apparatus 20 includes the first communication unit 28 capable of communicating with the database server 10, the operation unit 26, the display unit 26a, the external storage controller 30, the external storage device 31 being capable of connecting to the external storage controller 30, the first storage 29 storing the pieces of data 29a to be backed up for replacement for maintenance, the data selector unit 21a that receives an instruction of a selection range from a serviceman via the operation unit 26 and the display unit 26a, and automatically selects data to be backed up in the external storage device 31 in the selection range out of the pieces of data 29a, the backup unit 21b that backs up the data selected by the data selector unit 21a out of the pieces of data 29a in the external storage device 31 being connected, and sends the data unselected by the data selector unit 21a to the database server 10 for backup, and the restoring unit 21c that restores the data backed up in the external storage device 31 in the first storage 29 after replacement for the maintenance, then receives the data backed up in the database server 10, and restores the data in the first storage 29 after replacement for the maintenance without the serviceman, and the database server 10 includes the second communication unit 15 capable of communicating with the image forming apparatus 20, the second storage 17 that stores the database 17a capable of recording the data sent from the image forming apparatus 20, and the database manager 11a that records the data sent from the image forming apparatus 20 in the database 17a, and sends the data recorded in the database 17a to the image forming apparatus 20 to restore the data.

Acceding to the first embodiment, before replacing an internal storage device, it is possible to select data reliably when backing up the data.

2. Second Embodiment

Hereinafter, configurations, operations, and the like similar to the above-mentioned configurations, operations, and the like are denoted by the similar reference symbols, and description thereof will be omitted. Points different therefrom will mainly be described.

According to the first embodiment, when backing up data, data-necessary-immediately-after-maintenance is automatically selected. To the contrary, according to the second embodiment, when backing up data, a serviceman selects data-necessary-immediately-after-maintenance.

[Configuration of Image Forming Apparatus]

Figure 7:
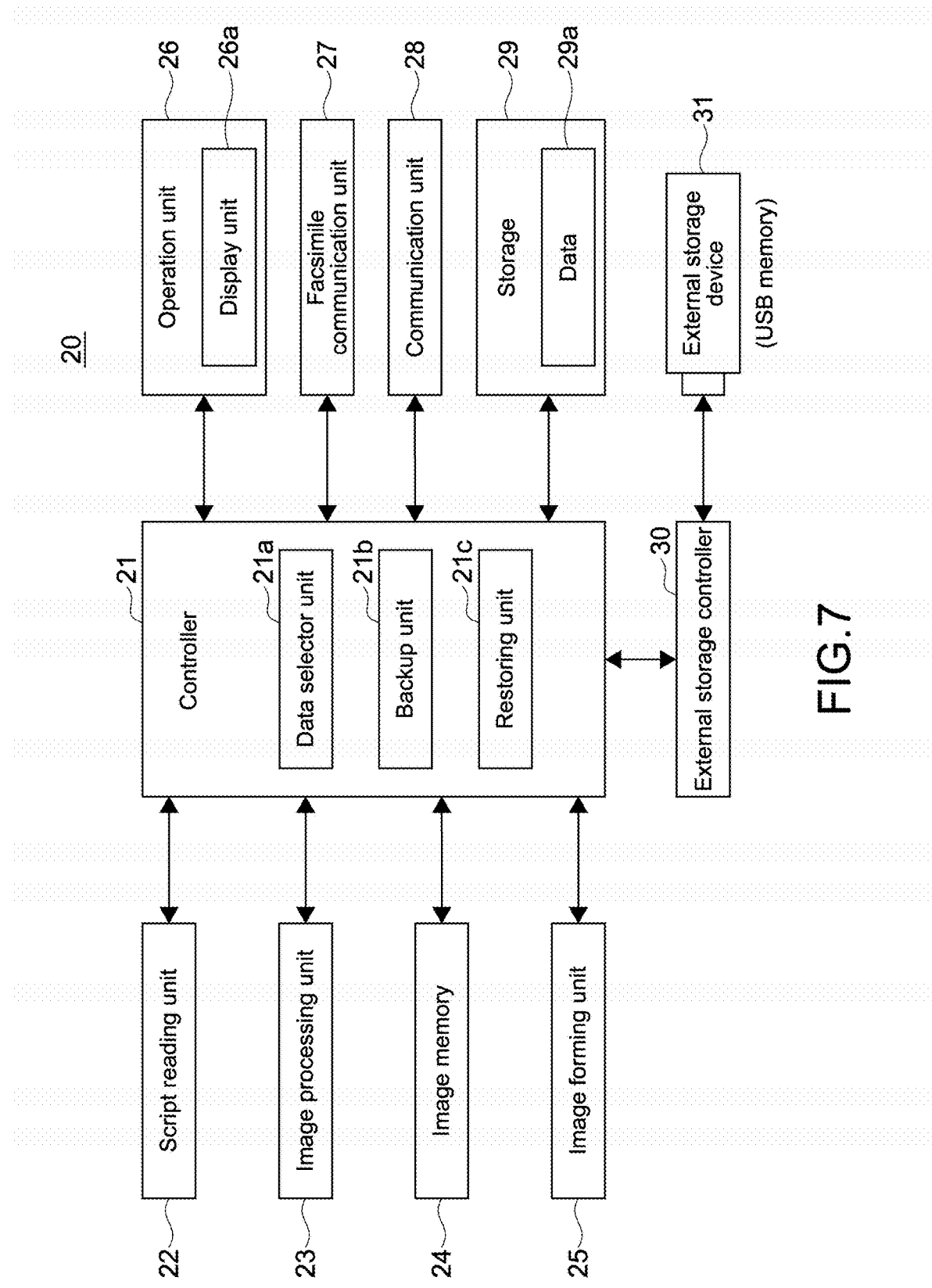
FIG. 7 shows the configuration of the image forming apparatus 20 of the second embodiment of the present disclosure.

The configuration of the image forming apparatus 20 will be described. FIG. 7 shows the configuration of the image forming apparatus 20 of the second embodiment.

The controller 21 includes the data selector unit 21a, the backup unit 21b, and the restoring unit 21c. The data selector unit 21a, the backup unit 21b, and the restoring unit 21c are functional blocks realized by loading programs stored in the ROM or the like into the RAM and executing the programs by the CPU.

The data selector unit 21a selects data, data instructed by a serviceman by using a data selecting window (described later).

The backup unit 21b backs up the data selected by the data selector unit 21a in the USB memory 31, and backs up the unselected data in the database server 10.

The restoring unit 21c restores data from the USB memory 31, and restores data from the database server 10.

The storage 29 stores the data 29a. Examples of the data 29a include script images obtained by the script reading unit 22, an address book, and the like. The storage 29 is a large-volume storage device such as an HDD.

[Data Selecting Window]

Figure 8:
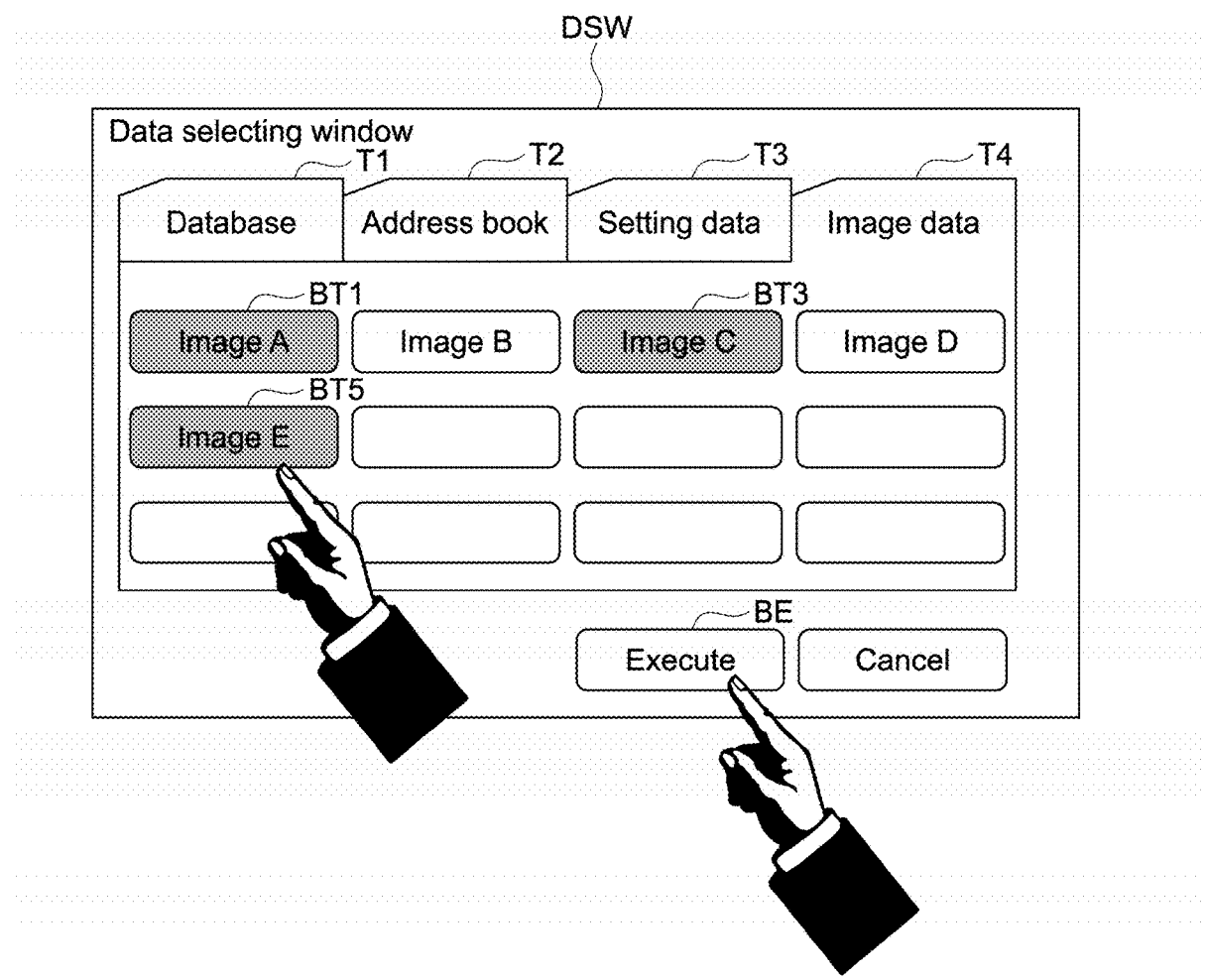
FIG. 8 shows an example of the data selecting window DSW.

Next, an example of the above-mentioned data selecting window will be described. FIG. 8 shows an example of the data selecting window DSW.

As shown in FIG. 8, the data selecting window DSW includes the tab T1 for selecting a database of the storage 29, the tab T2 for selecting an address book, the tab T3 for selecting setting data, and the tab T4 for selecting image data.

The tab T4 is selected. A serviceman selects the icon BT1 of the image A, the icon BT3 of the image C, and the icon BT5 of the image E, and then presses the execute button BE, whereby selection of data is instructed.

[Processing Flow]

The processing flow of the information processing system 1 of the second embodiment is similar to the processing flow (FIG. 5) of the information processing system 1 of the first embodiment except for the following.

According to the first embodiment, the data selector unit 21a automatically selects data to be backed up in the USB memory 31 via the operation unit 26 and the data selecting window (FIG. 5, Step S2). To the contrary, according to the second embodiment, the data selector unit 21a selects data to be backed up in the USB memory 31 via the operation unit 26 and the data selecting window, not automatically. In other words, before a serviceman replaces the storage 29 of the image forming apparatus 20, the serviceman "manually" backs up data-necessary-immediately-after-maintenance in the USB memory 31 that the serviceman has.

[Notes]

As described above, according to this embodiment, the information processing system 1 includes: the external storage device 31; the image forming apparatus 20; and the database server 10 connected to the image forming apparatus via a network, in which the image forming apparatus 20 includes the first communication unit 28 capable of communicating with the database server 10, the operation unit 26, the display unit 26a, the external storage controller 30, the external storage device 31 being capable of connecting to the external storage controller 30, the first storage 29 storing the pieces of data 29a to be backed up for replacement for maintenance, the data selector unit 21a that receives an instruction of selection from a serviceman via the operation unit 26 and the display unit 26a, and selects data to be backed up in the external storage device 31 based on the instruction of selection out of the pieces of data 29a, the backup unit 21b that backs up the data selected by the data selector unit 21a out of the pieces of data 29a in the external storage device 31 being connected, and sends the data unselected by the data selector unit 21a to the database server 10 for backup, and the restoring unit 21c that restores the data backed up in the external storage device 31 in the first storage 29 after replacement for the maintenance, then receives the data backed up in the database server 10, and restores the data in the first storage 29 after replacement for the maintenance without the serviceman, and the database server 10 includes the second communication unit 15 capable of communicating with the image forming apparatus 20, the second storage 17 that stores the database 17a capable of recording the data sent from the image forming apparatus 20, and the database manager 11a that records the data sent from the image forming apparatus 20 in the database 17a, and sends the data recorded in the database 17a to the image forming apparatus 20 to restore the data.

According to the second embodiment, it is possible to reduce time that a serviceman spends when he replaces an internal storage device.

3. Third Embodiment

In the following description, an image forming apparatus will be described as an example of an information processing apparatus, and a USB (Universal Serial Bus) memory will be described as an example of an external storage device in which data of the information processing apparatus is to be backed up.

[Outline]

First, the outline of the image forming apparatus of a third embodiment of the present disclosure will be described.

First, when the image forming apparatus is executing a print job, a facsimile send job, or the like, an alert is issued for an internal storage device.

In this case, a serviceman comes to the site of the image forming apparatus, and replaces the internal storage device of the image forming apparatus.

When replacing the internal storage device, the serviceman backs up data, which is now stored in the internal storage device of the image forming apparatus, in an external storage device, then replaces the internal storage device, and restores the backed-up data after replacement.

If a job is being executed when an alert is issued, typically, the job is interrupted and executed again from the start after replacing the internal storage device by the serviceman.

According to the image forming apparatus of the third embodiment of the present disclosure, when a job being executed is interrupted due to an alert, the status attribute of data of the interrupted job is changed to "job-being-executed", and then the data is backed up.

After restoring data, when restored data includes data having a status attribute "job-being-executed", the job is restarted by using the "job-being-executed" data based on information on the job-being-executed, which is recorded as the status attribute as well.

In this way, after the maintenance operation of replacing an internal storage device, it is possible to restart the interrupted job smoothly.

[Configuration of Image Forming Apparatus]

Figure 9:
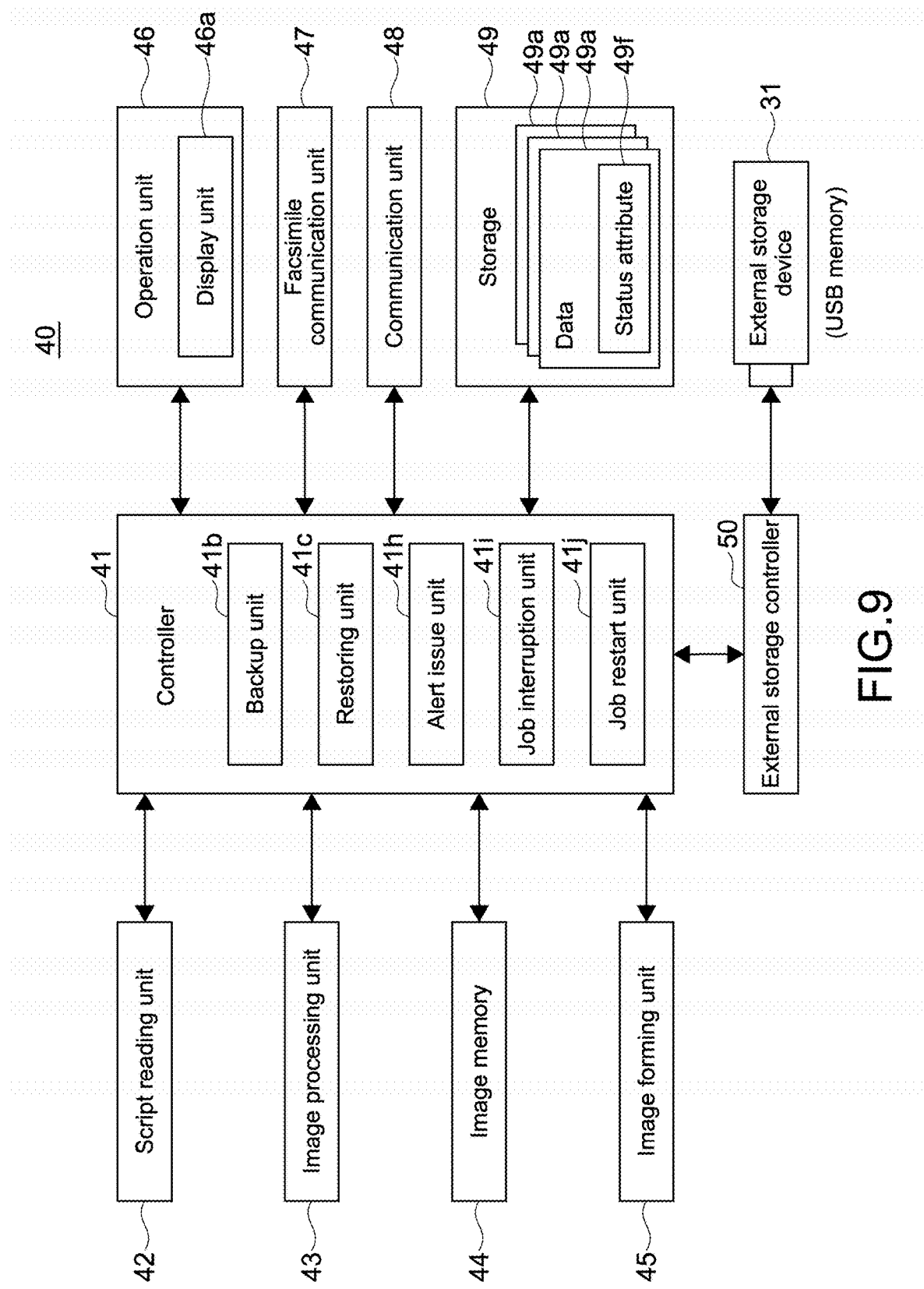
FIG. 9 shows the configuration of the image forming apparatus 40 of the third embodiment of the present disclosure.

Next, the configuration of the image forming apparatus will be described. FIG. 9 shows the configuration of the image forming apparatus 40.

The image forming apparatus 40 includes the controller 41. The controller 41 includes a CPU, a RAM, a ROM, a dedicated hardware circuit, and the like, and controls the entire operation of the image forming apparatus 40.

The controller 41 is connected to the script reading unit 42, the image processing unit 43, the image memory 44, the image forming unit 45, the operation unit 46, the display unit 46a, the facsimile communication unit 47, the communication unit 48, the storage 49, external storage controller 50, and the like. The controller 41 controls operations of the respective units connected thereto and exchanges signals and data with those units.

Further, the controller 41 includes the backup unit 41b, the restoring unit 41c, the alert issue unit 41h, the job interruption unit 41i, and the job restart unit 41j. The backup unit 41b, the restoring unit 41c, the alert issue unit 41h, the job interruption unit 41i, and the job restart unit 41j are functional blocks realized by loading programs stored in the ROM or the like into the RAM and executing the programs by the CPU.

The backup unit 41b backs up data stored in the storage 49 in the USB memory 31.

The restoring unit 41c restores data from the USB memory 31.

The alert issue unit 41h issues an alert when it is expected that a failure has occurred in the internal storage device, i.e., the storage 29.

When an alert is issued, the job interruption unit 41i interrupts the job being executed by the image forming apparatus 40, and changes the status attribute of the data of the interrupted job to "job-being-executed".

After the restoring unit 41c restores the data in the storage 49, the job restart unit 41j restarts the job whose status attribute records interruption by using the data having a status attribute "job-being-executed".

The storage 49 stores the data 49a. Examples of the data 49a include script images obtained by the script reading unit 42, an address book, and the like. The data 49a records the status attribute 49f. The storage 49 is a large-volume storage device such as an HDD.

[Processing Flow]

Figure 10:
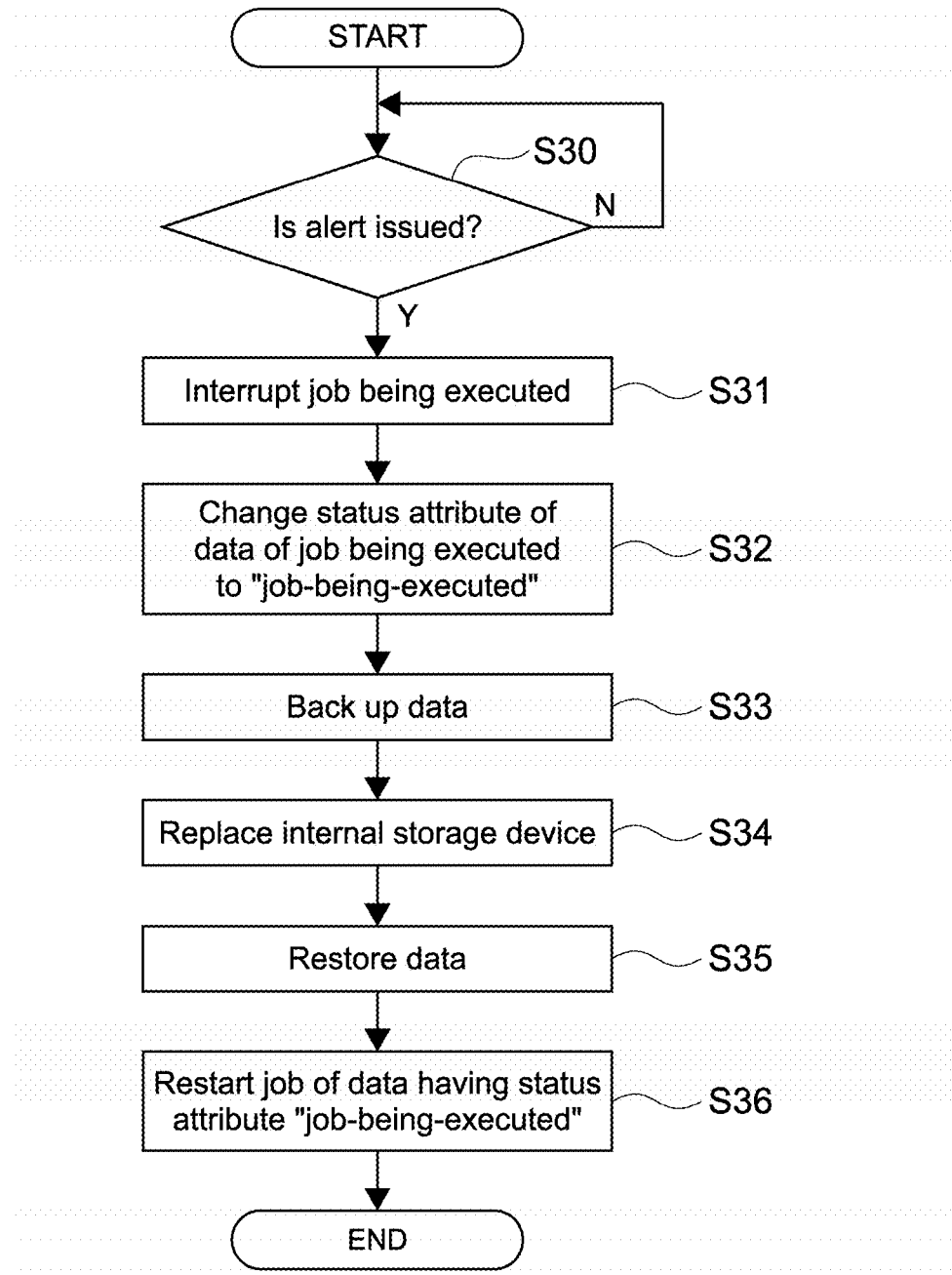
FIG. 10 shows the processing flow of the image forming apparatus 40.

Next, the processing flow of the image forming apparatus 40 will be described. FIG. 10 shows the processing flow of the image forming apparatus 40.

First, the job interruption unit 41i determines if the alert issue unit 41h has issued an alert or not (Step S30).

When an alert is not issued (Step S30, N), the job interruption unit 41i stands by and repeats Step S30.

When an alert is issued (Step S30, Y), the job interruption unit 41i interrupts the job being executed (Step S31).

Next, the job interruption unit 41i changes the status attribute of data to be used to "job-being-executed" out of the data used by the interrupted job (Step S32). Note that the kind of the interrupted job is also recorded in the status attribute.

Next, the backup unit 41b backs up the data in the storage 49 in the USB memory 31 (Step S33).

Next, a serviceman replaces the internal storage device, i.e., the storage 49 (Step S34).

Next, the restoring unit 41c restores the data from the USB memory 31 (Step S35).

Next, the job restart unit 41j retrieves the status attribute of the restored data, and restarts the job of the data having a status attribute "job-being-executed" (Step S36).

4. Fourth Embodiment

Next, an information processing apparatus of a fourth embodiment of the present disclosure will be described, where an image forming apparatus will be described as an example of the information processing apparatus. How to interrupt and restart a job in the fourth embodiment is similar to that in the third embodiment.

The difference is as follows. When replacing an internal storage device, i.e., a storage, data is backed up in a USB memory and in a database server of a network separately. Basically, data-necessary-immediately-after-maintenance is backed up in the USB memory and restored immediately after replacement of the internal storage device.

Data-necessary-not-immediately-after-maintenance is backed up in the database server and restored background not in hurry. Data of an interrupted job is backed up in the USB memory because it is necessary to restart the job immediately after maintenance.

[Entire Configuration]

The entire configuration of the information processing system according to the fourth embodiment of the present disclosure is similar to the information processing system (FIG. 1) of the first and second embodiments.

[Configuration of Image Forming Apparatus]

Figure 11:
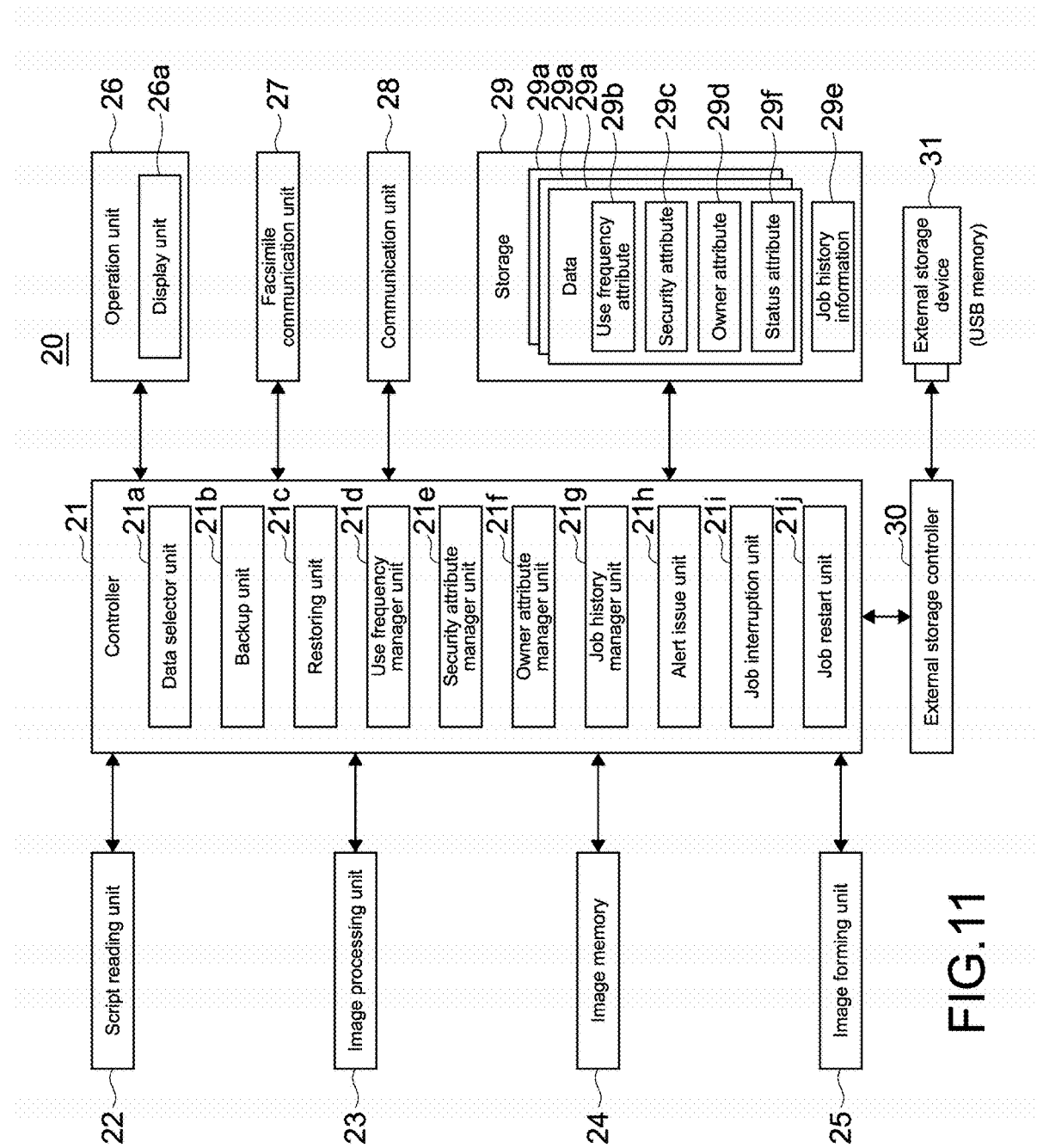
FIG. 11 shows the configuration of the image forming apparatus 20 of the fourth embodiment of the present disclosure.

Next, the configuration of the image forming apparatus 20 will be described. FIG. 11 shows the configuration of the image forming apparatus 20.

The controller 21 includes the data selector unit 21a, the backup unit 21b, the restoring unit 21c, the use frequency manager unit 21d, the security attribute manager unit 21e, the owner attribute manager unit 21f, the job history manager unit 21g, the alert issue unit 21h, the job interruption unit 21i, and the job restart unit 21j.

The data selector unit 21a, the backup unit 21b, the restoring unit 21c, the use frequency manager unit 21d, the security attribute manager unit 21e, the owner attribute manager unit 21f, the job history manager unit 21g, the alert issue unit 21h, the job interruption unit 21i, and the job restart unit 21j are functional blocks realized by loading programs stored in the ROM or the like into the RAM and executing the programs by the CPU.

The alert issue unit 21h is similar to the alert issue unit 41h of the third embodiment, and description thereof will thus be omitted.

The job interruption unit 21i is similar to the job interruption unit 41i of the third embodiment, and description thereof will thus be omitted.

The job restart unit 21j is similar to the job restart unit 41j of the third embodiment, and description thereof will thus be omitted.

The storage 29 stores the pieces of data 29a and the job history information 29e. Examples of the data 29a include script images obtained by the script reading unit 22, an address book, and the like. The data 29a contains not only the data itself but also the use frequency attribute 29b, the security attribute 29c, the owner attribute 29d, and the status attribute 29f as attribute information. The storage 29 is a large-volume storage device such as an HDD.

[Processing Flow (Overall)]

Figure 12:
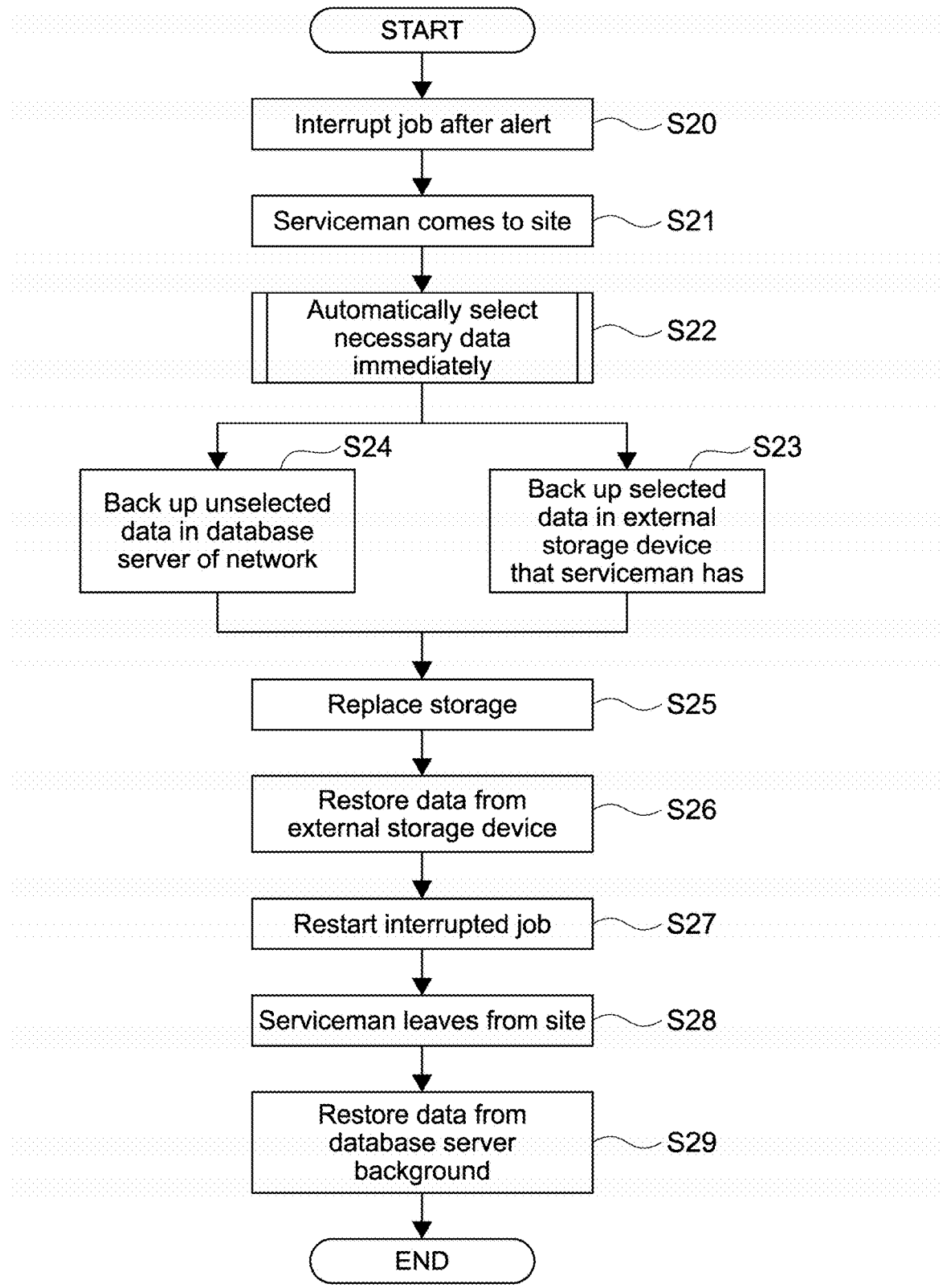
FIG. 12 shows the processing flow of the information processing system 1.

Next, the overall processing flow of the information processing system 1 will be described. FIG. 12 shows the processing flow of the information processing system 1.

First, when it is expected that a failure has occurred in the internal storage device, i.e., the storage 29, the alert issue unit 21h issues an alert, and the job interruption unit 21i interrupts the job being executed (Step S20).

Next, a serviceman comes to a site of the image forming apparatus 20 in order to replace the storage 29 of the image forming apparatus 20 (Step S21).

Next, the data selector unit 21a automatically selects data to be backed up in the USB memory 31 via the operation unit 26 and the data selecting window (of FIG. 4) (Step S2). Note that the selection processing will be described later in detail.

Next, the backup unit 21b backs up the selected data in the USB memory 31 that the serviceman has (Step S23), and backs up the unselected data in the database server 10 of the network (Step S24).

Next, the serviceman replaces the storage 29 (Step S25).

Next, the restoring unit 21c restores the data backed up in the USB memory 31 (Step S26).

Next, the interrupted job is restarted based on the data restored from the USB memory 31 (Step S27).

Next, the serviceman confirms operations of the image forming apparatus 20, and then leaves from the site (Step S28).

Next, the restoring unit 21c restores the data backed up in the database server 10 without the serviceman (Step S29).

[Processing Flow (Automatic Selection)]

Figure 13:
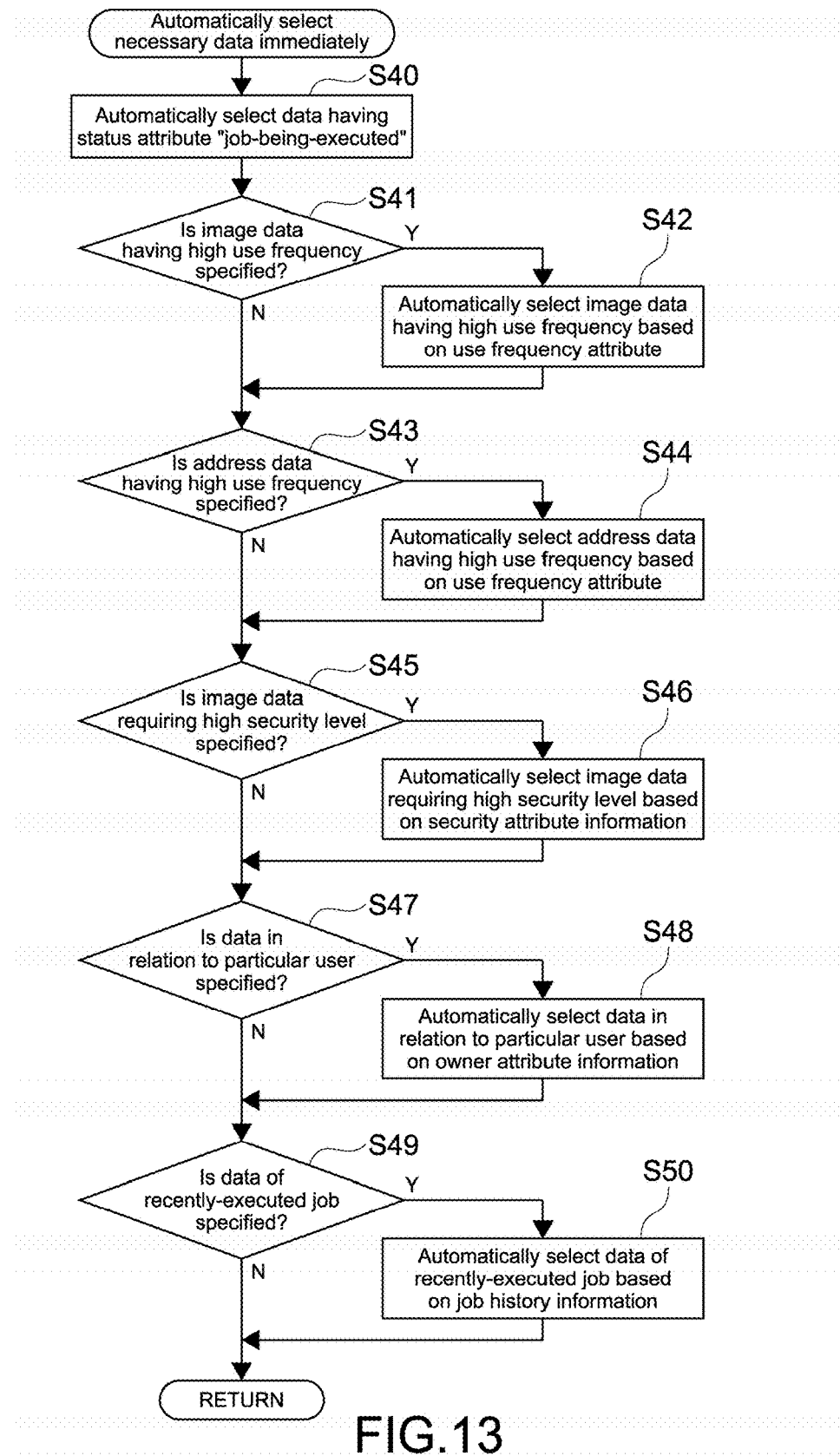

Next, the processing of automatically selecting data by the data selector unit 21a will be described. FIG. 13 shows the flow of automatically selecting data by the data selector unit 21a.

First, the data selector unit 21a automatically selects data having a status attribute "job-being-executed" (Step S40).

Next, the data selector unit 21a determines if image data having a use frequency higher than a first threshold is specified or not as the selection range of data to be backed up in the USB memory 31 (Step S41).

When image data having a use frequency higher than the first threshold is specified (Step S41, Y), the data selector unit 21a selects image data having a use frequency higher than the first threshold via the use frequency manager unit 21d (Step S42).

Next, the data selector unit 21a determines if address data having a use frequency higher than the first threshold is specified or not as the selection range of data to be backed up in the USB memory 31 (Step S43).

When address data having a use frequency higher than the first threshold is specified (Step S43, Y), the data selector unit 21a selects address data having a use frequency higher than the first threshold via the use frequency manager unit 21d (Step S44).

Next, the data selector unit 21a determines if image data requiring a high security level is specified or not as the selection range of data to be backed up in the USB memory 31 (Step S45).

When image data requiring a high security level is specified (Step S45, Y), the data selector unit 21a selects image data requiring a high security level via the security attribute manager unit 21e (Step S46).

Next, the data selector unit 21a determines if data in relation to a particular user is specified or not as the selection range of data to be backed up in the USB memory 31 (Step S47).

When data in relation to a particular user is specified (Step S47, Y), the data selector unit 21a selects data in relation to a particular user via the owner attribute manager unit 21f (Step S48).

Next, the data selector unit 21a determines if data of the specific number of recent jobs executed by the device is specified or not as the selection range of data to be backed up in the USB memory 31 (Step S49). Note that, for example, the recent means ten jobs executed lately.

When data of the specific number of recent jobs executed by the device is specified (Step S49, Y), the data selector unit 21a selects data of the specific number of recent jobs executed by the device via the job history manager unit 21g (Step S50).

Note that, in addition to automatically selecting data according to the above-mentioned method, a serviceman may specify pieces of data one by one and the selected data may be backed up additionally.

[Notes]

As described above, according to this embodiment, the information processing apparatus 40 includes: the external storage controller 50 capable of connecting to the external storage device 31; the storage 49 storing the pieces of data 49a to be backed up for replacement for maintenance, each of the pieces of data having the status attribute 49f indicating a status of the pieces of data 49a; the job interruption unit 41i that interrupts a job being executed when it is expected that a failure has occurred in the storage 49, and records that the job is interrupted and the interrupted job in the status attribute 49f of the data 49a in relation to the job being executed; the backup unit 41b that backs up the pieces of data 49a in the external storage device 31 being connected; the restoring unit 41c that restores the pieces of data 49a backed up in the external storage device 31 in the storage 49 after replacement for the maintenance; and the job restart unit 41j that retrieves the status attributes 49f of the pieces of data 49a after restoring the pieces of data 49a by the restoring unit 41c, and restarts the interrupted job based on the status attribute 49f of the data 49a recording that the job is interrupted.

According to this embodiment, even if an internal storage device is replaced when a job is being executed, it is possible to restart the job appropriately.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system, comprising:
an external storage device;
an image forming apparatus; and
a database server connected to the image forming apparatus via a network, wherein the image forming apparatus includes
a first communication unit capable of communicating with the database server,
an operation unit,
a display unit,
an external storage controller, the external storage device being capable of connecting to the external storage controller,
a first storage storing pieces of data to be backed up for replacement for maintenance,
a data selector circuit that
receives an instruction of a selection range from a serviceman via the operation unit and the display unit, and
automatically selects data to be backed up in the external storage device in the selection range out of the pieces of data,
a backup circuit that
backs up the data selected by the data selector circuit out of the pieces of data in the external storage device being connected, and
sends data unselected by the data selector circuit to the database server for backup, and
a restoring circuit that
restores the data backed up in the external storage device in a first storage after replacement for the maintenance, then
receives the data backed up in the database server, and
restores the data in the first storage after replacement for the maintenance without the serviceman, and
the database server includes
a second communication unit capable of communicating with the image forming apparatus,
a second storage that stores a database capable of recording the data sent from the image forming apparatus, and
a database manager circuit that
records the data sent from the image forming apparatus in the database, and
sends the data recorded in the database to the image forming apparatus to restore the data.

2. The information processing system according to claim 1, wherein
each of the pieces of data stored in the first storage has a use frequency attribute about a use frequency of the data,
the image forming apparatus further includes a use frequency manager circuit that manages the use frequency attributes according to the use frequencies of the pieces of data, and
the data selector circuit automatically selects, when receiving an instruction to select data having a use frequency higher than a first threshold as the selection range from the serviceman, data having a use frequency higher than the first threshold via the use frequency manager circuit.

3. The information processing system according to claim 2, wherein
each of the pieces of data stored in the first storage has a security attribute of a security level required for the data,
the image forming apparatus further includes a security attribute manager circuit that manages the security attributes of the pieces of data, and
the data selector circuit automatically selects, when receiving an instruction to select data requiring a high security level as the selection range from the serviceman, data requiring a high security level via the security attribute manager circuit, the data requiring the high security level being not to be backed up via the network.

4. The information processing system according to claim 3, wherein
each of the pieces of data stored in the first storage has an owner attribute of a particular user in relation to the data,
the image forming apparatus further includes an owner attribute manager circuit that manages the owner attributes of the pieces of data, and
the data selector circuit automatically selects, when receiving an instruction to select data in relation to a particular user as the selection range from the serviceman, data in relation to a particular user via the owner attribute manager circuit.

5. The information processing system according to claim 4, wherein
the first storage further stores job history information being a history of a job executed by the device,
the image forming apparatus further includes a job history manager circuit that manages the job history information, and
the data selector circuit automatically selects, when receiving an instruction to select data of a specific number of recent jobs executed by the device as the selection range from the serviceman, data of a specific number of recent jobs executed by the device via the job history manager circuit.

6. An information processing system, comprising:
an external storage device;
an image forming apparatus; and
a database server connected to the image forming apparatus via a network, wherein
the image forming apparatus includes
a first communication unit capable of communicating with the database server,
an operation unit,
a display unit,
an external storage controller, the external storage device being capable of connecting to the external storage controller,
a first storage storing pieces of data to be backed up for replacement for maintenance,
a data selector circuit that
receives an instruction of selection from a serviceman via the operation unit and the display unit, and
selects data to be backed up in the external storage device based on the instruction of selection out of the pieces of data,
a backup circuit that
backs up the data selected by the data selector circuit out of the pieces of data in the external storage device being connected, and
sends data unselected by the data selector circuit to the database server for backup, and
a restoring circuit that
restores the data backed up in the external storage device in a first storage after replacement for the maintenance, then
receives the data backed up in the database server, and
restores the data in the first storage after replacement for the maintenance without the serviceman, and
the database server includes
a second communication unit capable of communicating with the image forming apparatus,
a second storage that stores a database capable of recording the data sent from the image forming apparatus, and
a database manager circuit that
records the data sent from the image forming apparatus in the database, and
sends the data recorded in the database to the image forming apparatus to restore the data.

* * * * *